United States Patent
Tominaga et al.

(10) Patent No.: US 12,454,116 B2
(45) Date of Patent: Oct. 28, 2025

(54) DECORATIVE SHEET AND DECORATIVE MEMBER

(71) Applicant: TOPPAN INC., Tokyo (JP)

(72) Inventors: Takashi Tominaga, Tokyo (JP); Koichi Sagawa, Tokyo (JP)

(73) Assignee: TOPPAN INC., Tokyo (JP)

( * ) Notice: Subject to any disclaimer, the term of this patent is extended or adjusted under 35 U.S.C. 154(b) by 268 days.

(21) Appl. No.: 18/101,248

(22) Filed: Jan. 25, 2023

(65) Prior Publication Data

US 2023/0158770 A1 May 25, 2023

Related U.S. Application Data

(63) Continuation of application No. PCT/JP2020/042092, filed on Nov. 11, 2020.

(30) Foreign Application Priority Data

Aug. 31, 2020 (JP) ................. 2020-146137

(51) Int. Cl.
  *B32B 3/30* (2006.01)
  *B32B 27/20* (2006.01)
  *C09D 11/037* (2014.01)

(52) U.S. Cl.
  CPC ............. *B32B 3/30* (2013.01); *B32B 27/20* (2013.01); *C09D 11/037* (2013.01);
  (Continued)

(58) Field of Classification Search
  CPC ... B32B 3/30; B32B 27/20; B32B 2264/1051; B32B 2307/412; B32B 2307/732;
  (Continued)

(56) References Cited

U.S. PATENT DOCUMENTS

2007/0026087 A1 2/2007 Sugiura et al.
2011/0195108 A1 8/2011 Fujimori et al.
(Continued)

FOREIGN PATENT DOCUMENTS

EP 3 670 147 A1 6/2020
EP 3 695 724 A1 8/2020
(Continued)

OTHER PUBLICATIONS

International Searching Authority, "International Search Report," issued in connection with International Patent Application No. PCT/JP2020/042092, dated Jan. 12, 2021.
(Continued)

*Primary Examiner* — Megha M Gaitonde
(74) *Attorney, Agent, or Firm* — Foley & Lardner LLP

(57) ABSTRACT

A decorative sheet and a decorative member having both excellent antiviral properties and high processability. The decorative sheet is provided with a colored layer, a pattern layer, and a surface protective layer, wherein: the surface protective layer is provided with a first surface protective layer containing an antiviral agent and at least one of a heat-curable resin, an ultraviolet-curable resin, and an electron beam-curable resin; the addition amount of the antiviral agent is 0.2% by mass or more and 10% by mass or less with respect to the surface protective layer; and the average particle size of the antiviral agent is 1 μm or more and 10 μm or less.

5 Claims, 2 Drawing Sheets

(52) U.S. Cl.
CPC . *B32B 2264/1051* (2020.08); *B32B 2307/412* (2013.01); *B32B 2307/732* (2013.01); *B32B 2451/00* (2013.01); *B32B 2471/00* (2013.01)

(58) Field of Classification Search
CPC ............ B32B 2451/00; B32B 2471/00; B32B 2307/7376; B32B 21/02; B32B 21/08; B32B 27/08; B32B 2255/10; B32B 27/18; B32B 27/32; B32B 2255/26; B32B 2255/28; B32B 2264/067; B32B 2307/4026; B32B 38/06; B32B 38/145; C09D 11/037; C09D 7/61; C09D 7/63; C09D 7/65; C09D 201/00; C09D 7/62; C09D 201/04; C09D 201/10; E04F 13/07; E04F 13/08; C08K 3/08; C08K 9/12; C08K 2201/005
USPC ........ 428/156, 161, 172, 173, 212, 213, 220
See application file for complete search history.

(56) References Cited

U.S. PATENT DOCUMENTS

| | | |
|---|---|---|
| 2012/0301530 A1 | 11/2012 | Uhlmann et al. |
| 2012/0301531 A1 | 11/2012 | Uhlmann et al. |
| 2012/0301533 A1 | 11/2012 | Uhlmann et al. |
| 2013/0171225 A1 | 7/2013 | Uhlmann et al. |
| 2016/0107415 A1* | 4/2016 | Scheible ................. B32B 27/16 428/212 |
| 2018/0186131 A1 | 7/2018 | Kudo et al. |
| 2019/0037850 A1 | 2/2019 | Hasegawa et al. |
| 2019/0176446 A1 | 6/2019 | Kinoshita et al. |
| 2019/0202192 A1 | 7/2019 | Sekino et al. |
| 2019/0210343 A1 | 7/2019 | Oshima et al. |
| 2019/0248100 A1 | 8/2019 | Horio et al. |
| 2020/0215787 A1 | 7/2020 | Fujiwara et al. |
| 2020/0236946 A1 | 7/2020 | Horino et al. |
| 2021/0386071 A1 | 12/2021 | Niwa et al. |
| 2023/0064901 A1 | 3/2023 | Horino et al. |

FOREIGN PATENT DOCUMENTS

| | | |
|---|---|---|
| JP | H10-157031 A | 6/1998 |
| JP | H10-250013 A | 9/1998 |
| JP | H11-268224 A | 10/1999 |
| JP | 2000-351182 A | 12/2000 |
| JP | 2007-070299 A | 3/2007 |
| JP | 2007-268935 A | 10/2007 |
| JP | 2012-071421 A | 4/2012 |
| JP | 2013-193966 A | 9/2013 |
| JP | 2014-065283 A | 4/2014 |
| JP | 2015-080887 A | 4/2015 |
| JP | 2017-007156 A | 1/2017 |
| JP | 2017-019837 A | 1/2017 |
| JP | 2017-025170 A | 2/2017 |
| JP | 2017-065196 A | 4/2017 |
| JP | 2018-079603 A | 5/2018 |
| JP | 2018-171754 A | 11/2018 |
| JP | 2018-203897 A | 12/2018 |
| JP | 2019-018541 A | 2/2019 |
| JP | 2019-025918 A | 2/2019 |
| JP | 2019-043089 A | 3/2019 |
| JP | 2019-155776 A | 9/2019 |
| JP | 2021-181227 A | 11/2021 |
| KR | 10-2019-0052714 A | 5/2019 |
| KR | 10-2019-0070315 A | 6/2019 |
| TW | I368483 B | 7/2012 |
| TW | 201716244 A | 5/2017 |
| TW | 201827223 A | 8/2018 |
| WO | WO-2005/037296 A1 | 4/2005 |
| WO | WO-2010/026730 A1 | 3/2010 |
| WO | WO-2017/179383 A1 | 10/2017 |
| WO | WO-2020/137157 A1 | 7/2020 |

OTHER PUBLICATIONS

International Searching Authority, "Written Opinion," issued in connection with International Patent Application No. PCT/ JP2020/ 042092, dated Jan. 12, 2021.
European Extended Search Report issued in corresponding European Patent Application No. 20951601.2 dated Jan. 18, 2024 (10 pages).
Explanatory material on Biocide TB-B100 (from Taisho Technos Co., Ltd.).
Handbook of microparticles, (52-61 and 174-207), 1st Edition (1st Printing) Asakura Shoten Co., Ltd. Sep. 1, 1991.
Handbook of microparticles, (Sep. 1, 1991), 1st edition (1), Asakura Shoten Co., Ltd., 52-58.
Japanese Office Action issued in connection with JP Appl. Ser. No. 2020-146137 dated Mar. 2, 2021.
Opposition issued in connection with JP Patent No. 6981563 dated Jun. 13, 2022.
Opposition issued in connection with JP Patent No. 6981563 dated Jun. 14, 2022.
Reference Figure 1 (shows a relationship between the average size of antiviral-agent particles and the estimate results (relative values) of antiviral properties).
Office Action issued in corresponding Korean Patent Application No. 10-2023-7009969 dated Jan. 6, 2025.
Office Action issued in corresponding Taiwanese Patent Application No. 110132010 dated Mar. 4, 2025.

* cited by examiner

DECORATIVE SHEET AND DECORATIVE MEMBER

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/042092, filed on Nov. 11, 2020, which in turn claims the benefit of JP 2020-146137, filed Aug. 31, 2020, the disclosures of all which are incorporated herein by reference in its entirety.

TECHNICAL FIELD

The present disclosure relates to a decorative sheet and a decorative member.

BACKGROUND

Conventionally, decorative sheets that can be given antiviral properties by the addition of an antiviral agent have most of the antiviral agent blended into a resin and buried inside the molded article, resulting in a problem that an antiviral action is not exhibited at the surface of the decorative sheet.

In contrast, proposed is a decorative sheet has been proposed having excellent antiviral properties due to the addition of an antiviral agent to the outermost surface of the decorative sheet (for example, see PTL 1).

[Citation List] [Patent Literature] PTL 1: JP 2015-080887 A.

SUMMARY OF THE INVENTION

Technical Problem

In addition, when an antiviral agent is blended into a molded resin or a paint resin, there is a problem that, for example, the workability (such as the bending processability) of the decorative sheet tends to decrease.

The present disclosure has an object of providing a decorative sheet and a decorative member having both excellent antiviral properties and high processability.

Solution to Problem

In order to solve the problem described above, a decorative sheet according to an aspect of the present disclosure includes: a colored layer; a pattern layer; and a surface protective layer; wherein the surface protective layer is provided with a first surface protective layer that contains an antiviral agent and at least one of a heat-curable resin, an ultraviolet-curable resin, and an electron beam-curable resin, an addition amount of the antiviral agent with respect to the surface protective layer is 0.2% by mass or more and 10% by mass or less, and an average particle size of the antiviral agent is 1 µm or more and 10 µm or less.

Advantageous Effects of the Invention

With the decorative sheet according to an aspect of the present disclosure, it is possible to provide a decorative sheet and a decorative member having both high scratch resistance and antiviral properties.

DETAILED DESCRIPTION

Figure 1:
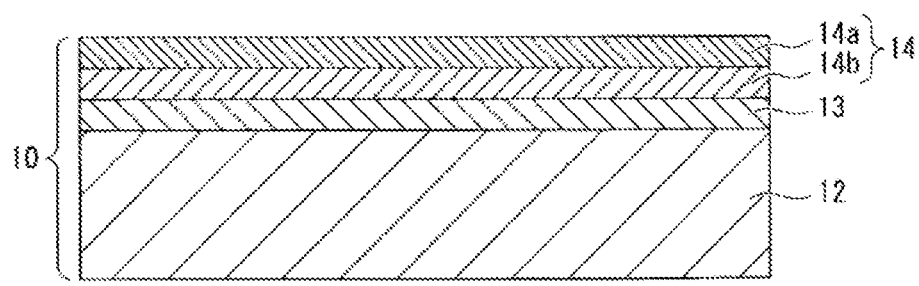
FIG. 1 is a cross-sectional view schematically illustrating an example of a configuration of a decorative sheet according to a first embodiment of the present disclosure.

An embodiment of the present disclosure will be described with reference to the drawings.

The configurations shown in the drawings are schematic, and the relationship between the thickness and horizontal dimensions, the thickness ratio between layers, and the like, differ from the actual values. Furthermore, the embodiments described below are merely examples of configurations for embodying the technical idea of the present disclosure, and the technical idea of the present disclosure should not limit the materials, shapes, structures, and the like of the components to those described below. The technical idea of the present disclosure can be modified in various ways within the technical scope defined by the claims.

First Embodiment (Configuration of Decorative Sheet)

The basic configuration of a decorative sheet according to a first embodiment of the present disclosure will be described using FIG. 1. FIG. 1 is a cross-sectional view for describing an example of a configuration of a decorative sheet 10 according to the first embodiment of the present disclosure.

As shown in FIG. 1, the decorative sheet 10 according to an embodiment of the present disclosure has a pattern layer 13 and a surface protective layer 14 laminated in this order on one surface of a colored layer 12. Furthermore, the surface protective layer 14 includes a first surface protective layer 14a and a second surface protective layer 14b. Each of the layers will be described in detail below.

(Colored Layer)

The colored layer 12 is a layer that serves as a substrate of the decorative sheet 10. In the present embodiment, a thermoplastic resin may be used as the colored layer 12. The thermoplastic resin is not particularly limited, and examples may include polyolefin resins such as polyethylene, polypropylene, polymethylpentene, polybutene, ethylene-propylene copolymer, ethylene-α-olefin copolymer, and propylene-α-olefin copolymer; polyolefin resins such as olefin-based copolymer resins such as ethylene-acetic acid vinyl copolymer, ethylene-vinyl alcohol copolymer, ethylene-(meth)acrylic acid (ester) copolymer, and metal neutralized product (ionomer) of an ethylene-unsaturated carboxylic acid copolymer; polyester resins such as polyethylene terephthalate, polybutylene terephthalate, polytetramethylene terephthalate, polyethylene naphthalate, polyethylene terephthalate-isophthalate copolymer, 1,4-cyclohexanedimethanol copolymerized polyethylene terephthalate, polyarylate, and polycarbonate; acrylic resins such as poly(meth)acrylonitrile, polymethyl(meth)acrylate, polyethyl(meth)acrylate, polybutyl(meth)acrylate, and polyacrylamide; polyamide resins such as nylon-6, nylon-6,6, and nylon-6,10; styrene resins such as polystyrene, AS resin, and ABS resin; vinyl resins such as polyvinyl chloride, polyvinyl acetate, polyvinyl alcohol, polyvinyl acetal, and polyvinyl butyral; fluororesins such as polyvinyl fluoride, polyvinylidene fluoride, polytetrafluoroethylene, ethylene-tetrafluoroethylene copolymer, and ethylene-perfluoroalkylvinylether copolymer; and mixtures, copolymers, complexes, and laminates of two or more of these materials.

Here, while many thermoplastic resins are mentioned above as thermoplastic resins that can be used as the colored layer 12, from the perspective of increasing social concerns over environmental problems in recent years, it is not preferable to use a thermoplastic resin containing chlorine (halogen) such as a polyvinyl chloride resin, and it is preferable to use a halogen-free thermoplastic resin. In particular, from the perspective of the physical properties, processability, versatility, cost-efficiency, and the like, a polyolefin resin or a polyester resin (amorphous or biaxially oriented) are most preferred to be used as the halogen-free thermoplastic resin.

The polyolefin resin may be appropriately selected and used from the many types listed above according to the purpose of use of the decorative sheet. Specifically, the most suitable for general use are polypropylene resins, that is, a homopolymer or a copolymer containing propylene as the main component. For example, a homopolypropylene resin, a random polypropylene resin, a block polypropylene resin, or the like, may be used alone or appropriately mixed, and a resin in which atactic polypropylene is appropriately additionally mixed with these resins may be used. The polyolefin resin may be a copolymer containing an olefin comonomer other than propylene, such as a propylene-α-olefin copolymer or the like having a crystalline polypropylene portion and containing α-olefin, other than propylene, with 2 to 20 carbons, preferably containing one or more comonomers from among ethylene, butene-1,4-methylpentene-1, hexene-1, and octene-1, at a ratio of 15 mol % or more. Also, a modifier which is typically used for softening polypropylene-based resins, such as low density polyethylene, ethylene-α-olefin copolymers, ethylene-propylene copolymer rubbers, ethylene-propylene-non-conjugated diene copolymer rubbers, styrene-butadiene copolymers, or a hydrogenated product thereof, can be added as appropriate.

Further, one or more types of additives selected from various additives such as colorants, fillers, ultraviolet absorbers, light stabilizers, heat stabilizers, antioxidants, antistatic agents, lubricants, flame retardants, antibacterial agents, antifungal agents, antifriction agents, light scattering agents, and luster modifiers may be added to the colored layer 12, as necessary.

The thickness of the colored layer 12 is preferably in a range of 40 µm or more and 150 µm or less, and is more preferably in a range of 50 µm or more and 130 µm or less. When the thickness of the colored layer 12 is 40 µm or more, it is possible to absorb irregularities and steps in the floor material serving as the base, which improves the finish of the constructed decorative sheet 10. Furthermore, when the thickness of the colored layer 12 is 150 µm or less, the colored layer 12 is not formed thicker than necessary, and the production cost of the decorative sheet 10 can be reduced.

(Pattern Layer)

The pattern layer 13 is formed on the colored layer 12, and is a layer which is provided as necessary to add a pattern for imparting designability. The pattern layer 13 can be omitted if it can be substituted by the coloring of the colored layer 12. The pattern layer 13 is formed by using a printing ink or a paint, which is obtained by dissolving or dispersing a colorant such as a dye or pigment in a suitable diluent solvent together with a suitable binder resin. The printing ink or paint is applied by various printing methods such as gravure printing or offset printing, or various coating methods such as gravure coating or roll coating. Furthermore, examples of the binder resin that can be used include urethane-based resins, acrylic-based resins, vinyl chloride-acetate resins, polyimide-based resins, nitrocellulose, and mixtures of these, but it is of course not limited to these. Moreover, an arbitrary pattern can be used as the pattern, and examples include a wood grain pattern, a stone pattern, a cloth pattern, an abstract pattern, a geometric pattern, letters, symbols, monochromatic solid color, or a combination of these. In addition, in order to improve concealment of the decorative sheet 10, an opaque printing ink or coating material containing a large amount of an opaque pigment such as titanium dioxide or iron oxide may be provided as a concealing layer between the pattern layer 13 and the colored layer 12.

The thickness of the pattern layer 13 is preferably in a range of 1 µm or more and 10 µm or less. When the thickness of the pattern layer 13 is 1 µm or more, the printing can be made clear. When the thickness of the pattern layer 13 is 10 µm or less, the printing processability when producing the decorative sheet 10 is improved, and the production cost can be reduced.

Furthermore, in order to impart various functions, for example, a functional additive such as an extender pigment, a plasticizer, a dispersant, a surfactant, a tackifier, an adhesive aid, a drying agent, a curing agent, a curing accelerator, and a curing retarder, may be added to the pattern layer 13.

Moreover, the pattern layer 13 may include, for example, a solid colored layer for concealing the color and pattern of the base on which the decorative sheet 10 is laminated, and a pattern layer to add a pattern for imparting designability.

(Surface Protective Layer)

The surface protective layer 14 is a layer formed on the pattern layer 13, and is a layer provided to impart functions such as weather resistance, scratch resistance, stain resistance, and designability to the decorative sheet 10.

The surface protective layer 14 may be a single layer, or the surface protective layer 14 may be formed by stacking a plurality of layers. As shown in FIG. 1, the decorative sheet 10 of the present embodiment is provided with two layers that serve as the surface protective layer 14, namely a first surface protective layer 14a and a second surface protective layer 14b. In the case of a structure where the surface protective layer 14 is configured by a single layer (single-layered structure), the first surface protective layer 14a serves as the surface protective layer 14.

In the method of forming the surface protective layer 14 including the first surface protective layer 14a and the second surface protective layer 14b, the surface protective layer 14 is formed by applying each layer and curing the coating film using a known coating device, thermal drying device, and ultraviolet irradiation device according to the type of curable resin.

The surface protective layer 14 has an important role in determining the quality of the bending processability, weather resistance, scratch resistance, and cleanability. The surface protective layer 14 is mainly composed of a curable resin (hardening resin). That is, it is preferable that the resin component is substantially composed of a curable resin. The term substantially refers to, for example, 80 parts by mass or more when the entire resin is 100 parts by mass. The surface protective layer 14 may contain various additives such as a weather resistance agent, a plasticizer, a stabilizer, a filler, a dispersant, a colorant such as a dye or pigment, a solvent, an ultraviolet absorber, a heat stabilizer, a light stabilizer, an anti-blocking agent, a catalyst scavenger, a colorant, a light scattering agent, and a gloss adjuster as necessary.

[First Surface Protective Layer]

Among the layers constituting the surface protective layer 14 (the first surface protective layer 14a and the second surface protective layer 14b), the first surface protective layer 14a represents the layer arranged at the outermost surface (outermost layer). In the present embodiment, the first surface protective layer 14a contains at least one of a heat-curable resin, an ultraviolet-curable resin, and an electron beam-curable resin. Note that electron beam-curable resins and ultraviolet-curable resins are collectively referred to as ionizing radiation-curable resins. The first surface protective layer 14a can generally be formed by a method in which a reactive resin is coated to form a coating film, and then curing the coating film by heating or irradiation with ionizing radiation. Differences in the properties of the first surface protective layer 14a can arise due to differences in the curing method. For example, in general, a first surface protective layer 14a formed of an ionizing radiation-curable resin has a high degree of cross-linking after the curing reaction, and thus tend to have both a high hardness and excellent scratch resistance. On the other hand, because a first surface protective layer 14a formed of a heat-curable resin has a relatively low degree of cross-linking, it tends to have a low hardness but excellent flexibility, such as bending and conformability to the substrate.

The first surface protective layer 14a may be mainly composed of any one of a heat-curable resin, an ultraviolet-curable resin, or an electron beam-curable resin. That is, the main component of the first surface protective layer 14a may be a heat-curable resin alone, or may be an ultraviolet-curable resin alone or ionizing radiation-curable resin alone.

For example, when the decorative sheet 10 is used as a member for fittings having many complicated shapes, flexibility (for example, processability) is often required. Therefore, in a decorative sheet 10 used for fittings, for example, it is preferable to use a heat-curable resin as the main component of the first surface protective layer 14a. When the decorative sheet 10 requires scratch resistance rather than flexibility, it is preferable to use an ionizing radiation-curable resin.

Furthermore, the main component of the first surface protective layer 14a may be a mixture of a heat-curable resin, an ultraviolet-curable resin, and an electron beam-curable resin. When such a mixture is used as the main component, the ratio of the heat-curable resin, the ultraviolet-curable resin, and the electron beam-curable resin in the first surface protective layer 14a is controlled such that the decorative sheet 10 can be used according to the requirements of various applications.

For example, when the decorative sheet 10 is used for fittings, it is preferable that the mixture of the heat-curable resin, the ultraviolet-curable resin, and the electron beam-curable resin, which are the main components of the first surface protective layer 14a, contains the largest amount of heat-curable resin. Specifically, the heat-curable resin exceeds 50% by weight in the mixture, and preferably 70% by weight or more, more preferably 75% by weight or more, and even more preferably 80% by weight or more.

In addition, for example, when the decorative sheet 10 is required to have scratch resistance, it is preferable that the mixture of the heat-curable resin, the ultraviolet-curable resin, and the electron beam-curable resin, which are the main components of the first surface protective layer 14a, contains at least one of the ultraviolet-curable resin and the electron beam-curable resin in the greatest amount. Specifically, the ultraviolet-curable resin or the electron beam-curable resin exceeds 50% by weight in the mixture, and preferably represents 70% by weight or more, more preferably represents 75% by weight or more, and even more preferably represents 80% by weight or more.

As a result of the main component of the first surface protective layer 14a, which corresponds to the outermost layer of the surface protective layer 14, being a mixture of a heat-curable resin, an ultraviolet-curable resin, and an electron beam-curable resin, the surface protective layer 14 satisfies the scratch resistance while also being less likely to whiten or crack during bending.

However, the performance of the decorative sheet 10 such as the scratch resistance and processability described above is not determined only by the difference in the curing method of the resin used for the first surface protective layer 14a. The performance of the decorative sheet 10 (here, the scratch resistance and processability) largely depends on the material design of the resin itself and the additional action of additives such as fillers, that is, the physical properties of the various components contained in the surface protective layer 14. Therefore, the design of the surface protective layer 14 as a whole becomes important.

[Ionizing Radiation-Curable Resin]

Here, the ionizing radiation-curable resin (which includes ultraviolet-curable resins and electron beam-curable resins) used in the first surface protective layer 14a is not particularly limited, and a transparent resin mainly composed of prepolymers (including oligomers) and/or monomers containing radically polymerizable double bonds capable of undergoing polymerization and cross-linking reactions by irradiation with ionizing radiation such as ultraviolet light or an electron beam can be used. Such a prepolymer or monomer may be used singly or as a mixture thereof. The curing reaction in an ionizing radiation-curable resin is typically a cross-linking curing reaction.

Specifically, examples of the prepolymer or monomer mentioned above include compounds containing a radically polymerizable unsaturated group such as a (meth)acryloyl group and or (meth)acryloyloxy group, a cationic polymerizable functional group such as an epoxy group, or the like in the molecule. Here, a (meth)acryloyl group refers to an acryloyl group or a methacryloyl group.

Examples of the prepolymer containing a radically polymerizable unsaturated group include a polyester (meth) acrylate, urethane (meth)acrylate, epoxy (meth)acrylate, melamine (meth)acrylate, triazine (meth)acrylate, and silicone (meth)acrylate. The molecular weight is preferably in the order of 250 to 100,000.

Examples of the monomer containing a radically polymerizable unsaturated group include monofunctional monomers such as methyl (meth)acrylate, 2-ethylhexyl (meth) acrylate, and phenoxyethyl (meth)acrylate. Furthermore, examples of the polyfunctional monomer include diethylene glycol di(meth)acrylate, propylene glycol di(meth)acrylate, trimethylolpropane tri(meth)acrylate, trimethylolpropane ethylene oxide tri(meth)acrylate, dipentaerythritol tetra(m- eth)acrylate, dipentaerythritol penta(meth)acrylate, and dipentaerythritol hexa(meth)acrylate.

Examples of the prepolymer containing a cationic polymerizable functional group include prepolymers of epoxy-based resins such as bisphenol type epoxy resin and novolak type epoxy compound, and vinyl ether-based resins such as fatty acid vinyl ether and aromatic vinyl ether.

Furthermore, a polyene/thiol-based prepolymer made of a combination of a polyene and a polythiol is also preferred as the prepolymer described above. Examples of the thiol include polythiols such as trimethylolpropane trithioglycolate and pentaerythritol tetrathioglycolate. Examples of the polyene include those having an allyl alcohol added on both ends of a polyurethane formed from a diol and diisocyanate.

As the ionizing radiation used for curing the ionizing radiation-curable resin, electromagnetic waves or charged particles having an energy capable of causing a curing reaction of the molecules in the ionizing radiation-curable resin (composition) are used. Ultraviolet light or an electron beam is typically used, but visible light, X-rays, or an ion beam may also be used.

The ultraviolet light source may be a light source such as a super high-pressure mercury lamp, a high-pressure mercury lamp, a low-pressure mercury lamp, a carbon arc lamp, a black light, or a metal halide lamp. Generally, the wavelength of ultraviolet light is preferably in a range of 190 nm or more and 380 nm or less.

Examples of electron beam sources that can be used include various electron beam accelerators such as a Cockcroft-Walton type, a Van de Graaff type, a resonance transformer type, an insulated core transformer type, a linear type, a Dynamitron type, and a high-frequency type. Among them, those capable of irradiating electrons having an energy in a range of 100 keV or more and 1000 keV or less are particularly preferable, and those capable of irradiating electrons having an energy of 100 keV or more and 300 keV or less are even more preferable.

[Heat-Curable Resin]

Here, although the heat-curable resin used for the first surface protective layer 14a is not particularly limited, examples include a two-component curable urethane resin. Although the two-component curable urethane resin is not particularly limited, a resin that contains a polyol component having an OH group (such as acrylic polyol, polyester polyol, polyether polyol, and epoxy polyol) as a main agent and an isocyanate component (such as tolylene diisocyanate, hexamethylene diisocyanate, and meta-xylene diisocyanate) as a curing agent component can be used. Furthermore, the heat-curable resin is not limited to this, and a one-component reaction curable polyurethane resin, a one-component or two-component reaction curable epoxy resin, and the like, may also be used.

Moreover, a surfactant is added to the surface protective layer 14. The surfactant includes at least one of a cationic surfactant, an amphoteric surfactant, and a nonionic surfactant. By adding the surfactant, the compatibility between the silver-based antiviral agent and the surface protective layer in the binder is improved, and a decorative sheet can be obtained in which concentration variations due to precipitation of the antiviral agent and the like during application are suppressed.

In addition, the layer thickness of the first surface protective layer 14a is preferably in a range of 3 μm or more and 15 μm or less. When the thickness of the first surface protective layer 14a is 3 μm or more, various resistances such as the scratch resistance, abrasion resistance, and weather resistance are improved. When the thickness of the first surface protective layer 14a is 15 μm or less, the cost can be reduced without the need to use a larger amount of resin material than necessary.

[Antiviral Agent]

The surface protective layer 14 contains an antiviral agent that improves the antiviral properties.

The antiviral agent is preferably made of a silver-based material. Inorganic antibacterial agents such as antibacterial zeolite, antibacterial apatite, and antibacterial zirconia formed by incorporating any of the metal ions among silver ions, copper ions, and zinc ions into a material such as zeolite, apatite, and zirconia, which are inorganic materials, may be used as the antiviral agent, and further, zinc pyridione, 2-(4-thiazolyl)-benzimidazole, 10,10-oxybis phenoxarsine, organic nitrogen-sulfur-halogen compounds, and pyridine-2-thiol-oxide and the like can be used as the antiviral agent; however, silver-based antiviral agents are superior in terms of the antiviral effect.

Furthermore, the antiviral agent may have a configuration in which a silver-based material is supported on an inorganic material. This makes it possible to obtain a decorative sheet 10 with excellent durability in terms of the antiviral effect.

The addition amount of the antiviral agent with respect to the surface protective layer 14 is in a range of 0.2% by mass or more and 10% by mass or less. When the amount of the antiviral agent added is 0.2% by mass or more, the action of the antiviral agent is effective and the antiviral properties are improved. When the addition amount of the antiviral agent is 10% by mass or less, the scratch resistance is improved.

The average particle size of the antiviral agent is preferably 0.5 times or more and 2 times or less the thickness of the surface protective layer 14. That is, it is desirable that the relationship $0.5 \leq \Phi \leq 2D$ holds, where 1 is the average particle size of the antiviral agent and D is the thickness of the surface protective layer. When the average particle size of the antiviral agent is 0.5 times or more and 2 times or less the thickness of the surface protective layer 14, the antiviral properties are improved by increasing the contact surface area with the antiviral agent, and by increasing the surface area of the antiviral agent itself.

Furthermore, the average particle size of the antiviral agent is preferably 1 μm or more and 10 μm or less. When the average particle size of the antiviral agent is 1 μm or more, the contact area between the surface protective layer 14 and the antiviral agent is improved, resulting in good antiviral properties. When the average particle size of the antiviral agent is 10 μm or less, the scratch resistance is improved.

Moreover, it is preferable that there exists a plurality of peaks in the particle sizes of the antiviral agent. Specifically, it is preferable that the peaks in the particle sizes of the antiviral agent consist of two peaks, and the two peaks include a first peak in a range of 1 μm or more and 5 μm or less, and a second peak in a range of 5 μm or more and 10 μm or less. Here, the second peak in the particle sizes of the antiviral agent is assumed to be greater than the first peak. The presence of a plurality of peaks in the particle sizes of the antiviral agent improves the packing density of antiviral agent and allows more antiviral agent to be added. Consequently, the contact area with the antiviral agent is increased, and the surface area of the antiviral agent itself is also increased, resulting in an improvement in the antiviral properties.

In addition, in the decorative sheet 10 according to the present embodiment, for example, as a means for improving the stain resistance, a silicon-based component (such as a silicone resin) or a fluorine-based component (such as a fluororesin) may be set as the outermost surface (first surface protective layer 14a) of the decorative sheet 10.

[Silicone Resin]

When a silicone resin is used, it is preferable to use a modified silicone from the viewpoint of adhesion and compatibility with the surroundings. When the curable resin constituting the first surface protective layer 14a is formed of an ultraviolet-curable resin or an electron beam-curable resin, the modified silicone is preferably a modified silicone resin reactive to ionizing radiation. Furthermore, when the curable resin constituting the first surface protective layer 14a is formed of a heat-curable resin, the modified silicone is preferably a modified silicone resin reactive to heat. In addition, when the curable resin constituting the first surface protective layer 14a is formed of a mixture of an ionizing radiation-curable resin and a heat-curable resin, the modified silicone is preferably a modified silicone resin having at least one of a reactivity to ionizing radiation and a reactivity to heat.

Modified silicones can be classified into reactive modified silicones and non-reactive silicones. Examples of modified silicones that are reactive to heat include monoamine-modified silicone, diamine-modified silicone, epoxy-modified silicone, carbinol-modified silicone, carboxy-modified silicone, mercapto-modified silicone, silanol-modified silicone, alcohol-modified silicone, and diol-modified silicone. Examples of modified silicones that are reactive to ionizing radiation include acrylic-modified silicone and methacrylic-modified silicone. In addition, examples also include polyether-modified silicone, aralkyl-modified silicone, long-chain alkyl-modified silicone, and higher fatty acid ester-modified silicone, which are non-reactive modified silicones. Manufacturers of these modified silicones include Shin-Etsu Chemical Co., Ltd., Dow Corning Toray Co., Ltd., Momentive Performance Materials Japan LLC, Wacker Asahikasei Silicone Co., Ltd., and the like.

[Fluororesin]

Fluoropolymers are widely known to exhibit a minimal level of surface tension and are suitable as stain resistant materials. Examples of the fluororesin contained in the first surface protective layer 14a include tetrafluoroethylene resin, tetrafluoroethylene-ethylene copolymer, polyvinylidene fluoride, and many other derivatives can also be used. Manufacturers of these fluororesins include Daikin Industries, Ltd., DuPont Mitsui Fluorochemicals Co., Ltd., and the like. The amount of the fluororesin contained in the first surface protective layer 14a is preferably 10 parts by mass or more and 100 parts by mass or less. More preferably, the amount is 20 parts by mass or more. Here, the fluororesin itself may be a curable resin. That is, part of the fluororesin may also serve as part of the curable resin serving as the main component of the surface protective layer 14 (the first surface protective layer 14a and the second surface protective layer 14b). For example, the entire resin component of the second surface protective layer 14b may be a fluororesin.

As described above, in the decorative sheet 10 according to the present embodiment, the outermost layer of the surface protective layer 14, that is, the first surface protective layer 14a may contain at least either a silicone-based component or a fluorine-based component. As a result, the stain resistance of the decorative sheet 10 can be improved. When the stain resistance is improved, viruses can be prevented from remaining on the surface of the decorative sheet 10 for a long period of time, and as a result, the antiviral properties can be further improved.

Furthermore, in order to improve the adhesive strength of each layer of the decorative sheet 10, an adhesive layer containing a two-component curable urethane adhesive using an isocyanate curing agent may be provided between the pattern layer 13 and the surface protective layer 14.

[Second Surface Protective Layer]

Among the layers constituting the surface protective layer 14 (the first surface protective layer 14a and the second surface protective layer 14b), the second surface protective layer 14b represents the layer (inner layer) formed between the outermost layer and the pattern layer 13. In the present embodiment, like the first surface protective layer 14a, the second surface protective layer 14b contains at least one of a heat-curable resin, an ultraviolet-curable resin, and an electron beam-curable resin. Note that, because the heat-curable resin, the ultraviolet-curable resin, and the electron beam-curable resin are the same as the curable resin contained in the first surface protective layer 14a, the description will be omitted.

Like the first surface protective layer 14a, the second surface protective layer 14b may contain an antiviral agent and a surfactant. Here, the antiviral agent contained in the second surface protective layer 14b may be the same material as the antiviral agent contained in the first surface protective layer 14a, or it may be a different material to the antiviral agent contained in the first surface protective layer 14a.

(Modification)

Figure 2:
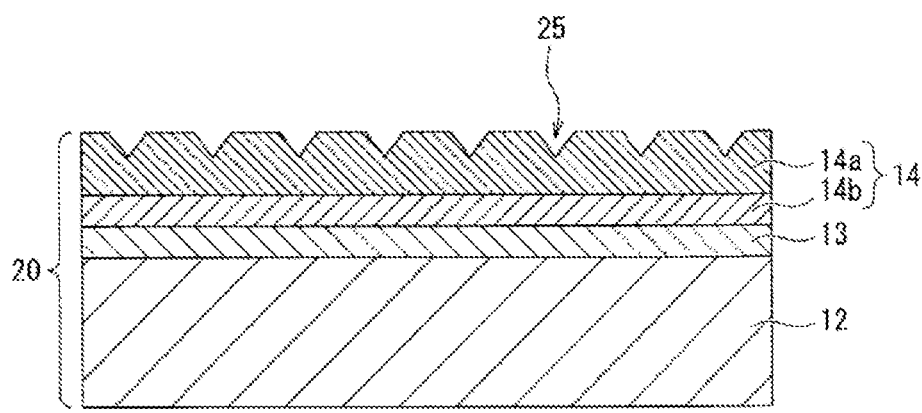
FIG. 2 is a cross-sectional view schematically illustrating an example of a modification of the decorative sheet according to the first embodiment of the present disclosure.

A modification of the decorative sheet according to the first embodiment will be described with reference to FIG. 2. FIG. 2 is a schematic cross-sectional view for describing an example of a configuration of a decorative sheet 20 according to a modification of the first embodiment. As shown in FIG. 2, in the decorative sheet 10, the surface of the surface protective layer 14, that is, the surface of the first surface protective layer 14a, may be formed with an embossed portion 25 for imparting a given designability. The uneven pattern is typically formed by embossing. The embossing method is not particularly limited. A known sheet-fed or rotary embossing machine is used for embossing. The uneven shape of the embossed portion 25 includes, for example, wood-grain vessels, stone surface unevenness (such as a granite cleavage plane), textile surface textures, satin finishes, sand grains, hairlines, parallel grooves, and the like.

Effects of First Embodiment

The decorative sheet 10 according to the present embodiment provides the following effects.

(1) The addition amount of the antiviral agent with respect to the decorative sheet 10 of the present embodiment is 0.2% parts by mass or more and 10% parts by mass or less.

According to this configuration, higher antiviral properties can be achieved without affecting the strength of the entire decorative sheet.

(2) The average particle size of the antiviral agent in the decorative sheet 10 of the present embodiment is 1 μm or more and 10 μm or less.

According to this configuration, the contact area of the antiviral agent increases, and the surface area of the antiviral agent itself is increased, which enables high antiviral properties to be realized.

Second Embodiment (Configuration of Decorative Sheet)

Figure 3:
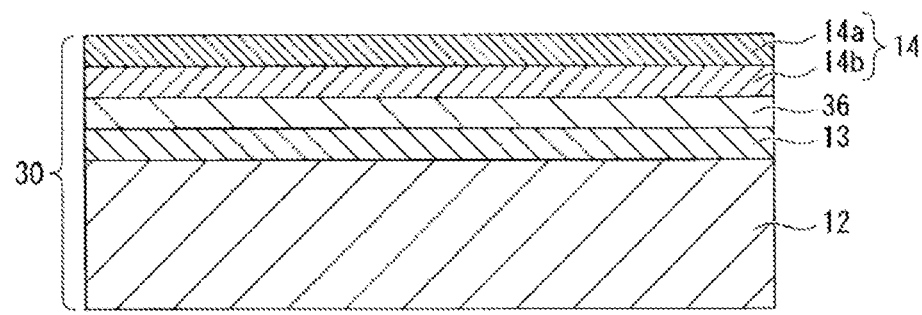
FIG. 3 is a cross-sectional view schematically illustrating an example of a configuration of a decorative sheet according to a second embodiment of the present disclosure.

A decorative sheet according to a second embodiment of the present disclosure will be described using FIG. 3. FIG. 3 is a cross-sectional view for describing an example of a configuration of a decorative sheet 30 according to the second embodiment of the present disclosure.

The decorative sheet 30 has a pattern layer 13, a transparent resin layer 36, and a surface protective layer 14 laminated in this order on one surface of a colored layer 12.

That is, the decorative sheet 30 differs from the decorative sheet 10 according to the first embodiment in that it includes the transparent resin layer 36.

The transparent resin layer 36 will be described below. Because the layers other than the transparent resin layer 36 (the colored layer 12, the pattern layer 13, and the surface protective layer 14) have the same structure as the layers of the decorative sheet 10, the description will be omitted.

(Transparent Resin Layer)

As shown in FIG. 3, the transparent resin layer 36 is a layer formed between the pattern layer 13 and the surface protective layer 14.

The thickness of the transparent resin layer 36 is preferably, for example, 30 µm or more and 200 µm or less. When the thickness of the transparent resin layer 36 is 30 µm or more, the scratch resistance of the transparent resin layer 36 against wear and scratches on the surface of the decorative sheet is sufficiently high. Furthermore, when the thickness of the transparent resin layer 36 is 200 µm or less, the bending properties of the decorative sheet do not become excessively high, and even when the floor member to which the decorative sheet is attached is not flat, the decorative sheet can be applied in close contact with the floor member.

[Resin Material]

As the resin material constituting the transparent resin layer 36, for example, a thermoplastic resin can be used in a similar manner to the colored layer 12. The thermoplastic resin is not particularly limited, and examples may include polyolefin resins such as polyethylene, polypropylene, polymethylpentene, polybutene, ethylene-propylene copolymer, ethylene-α-olefin copolymer, and propylene-α-olefin copolymer; polyolefin resins such as olefin-based copolymer resins such as ethylene-acetic acid vinyl copolymer, ethylene-vinyl alcohol copolymer, ethylene-(meth)acrylic acid (ester) copolymer, and metal neutralized product (ionomer) of an ethylene-unsaturated carboxylic acid copolymer; polyester resins such as polyethylene terephthalate, polybutylene terephthalate, polytetramethylene terephthalate, polyethylene naphthalate, polyethylene terephthalate-isophthalate copolymer, 1,4-cyclohexanedimethanol copolymerized polyethylene terephthalate, polyarylate, and polycarbonate; acrylic resins such as poly(meth)acrylonitrile, polymethyl (meth)acrylate, polyethyl(meth)acrylate, polybutyl(meth) acrylate, and polyacrylamide; polyamide resins such as nylon-6, nylon-6,6, and nylon-6,10; styrene resins such as polystyrene, AS resin, and ABS resin; vinyl resins such as polyvinyl chloride, polyvinyl acetate, polyvinyl alcohol, polyvinyl acetal, and polyvinyl butyral; fluororesins such as polyvinyl fluoride, polyvinylidene fluoride, polytetrafluoroethylene, ethylene-tetrafluoroethylene copolymer, and ethylene-perfluoroalkylvinylether copolymer; and mixtures, copolymers, complexes, and laminates of two or more of these materials.

Here, while many thermoplastic resins are mentioned above as thermoplastic resin that can be used as the transparent resin layer 36, from the perspective of the increasing social concern over environmental problems in recent years, it is not preferable to use a thermoplastic resin containing chlorine (a halogen) such as a polyvinyl chloride resin, and it is preferable to use a halogen-free thermoplastic resin. In particular, from the perspective of the physical properties, processability, versatility, cost-efficiency, and the like, a polyolefin resin or a polyester resin (amorphous or biaxially oriented) are most preferred to be used as the halogen-free thermoplastic resin.

The polyolefin resin may be appropriately selected and used from the many types listed above according to the purpose of use of the decorative sheet. Specifically, the most suitable for general use are polypropylene resins, that is, a homopolymer or a copolymer containing propylene as the main component. For example, a homopolypropylene resin, a random polypropylene resin, a block polypropylene resin, or the like, may be used alone or appropriately mixed, and a resin in which atactic polypropylene is appropriately additionally mixed with these resins may be used. The polyolefin resin may be a copolymer containing an olefin comonomer other than propylene, such as a propylene-α-olefin copolymer or the like having a crystalline polypropylene portion and containing α-olefin, other than propylene, with 2 to 20 carbons, preferably containing one or more comonomers from among ethylene, butene-1,4-methylpentene-1, hexene-1, and octene-1, at a ratio of 15 mol % or more. Also, a modifier which is typically used for softening polypropylene-based resins, such as low density polyethylene, ethylene-α-olefin copolymers, ethylene-propylene copolymer rubbers, ethylene-propylene-non-conjugated diene copolymer rubbers, styrene-butadiene copolymers, or a hydrogenated product thereof, can be added as appropriate.

One or more types of additives selected from various additives such as colorants, fillers, ultraviolet absorbers, light stabilizers, heat stabilizers, antioxidants, antistatic agents, lubricants, flame retardants, antibacterial agents, antifungal agents, antifriction agents, light scattering agents and luster modifiers may be added to the transparent resin layer 36 as necessary. The transparent resin layer 36 preferably has transparency (colorless and transparent, colored and transparent, or translucent) to an extent where the pattern of the pattern layer 13 can be seen via the surface (upper surface) of the decorative sheet 30.

Furthermore, like the surface protective layer 14, the transparent resin layer 36 may contain an antiviral agent that improves the antiviral properties. By including an antiviral agent in the surface protective layer 14, the outermost surface of the decorative sheet can maintain the antiviral properties. As a result of an antiviral agent being contained in both the transparent resin layer 36 and the surface protective layer 14, the antiviral properties are provided even if the transparent resin layer 36 becomes exposed due to abrasion of the surface protective layer 14. For this reason, it is more preferable that both the surface protective layer 14 and the transparent resin layer 36 contain an antiviral agent. Since the antiviral agent has the same configuration as the antiviral agent contained in the surface protective layer 14 of the decorative sheet 10, the description is omitted.

(Modification)

Figure 4:
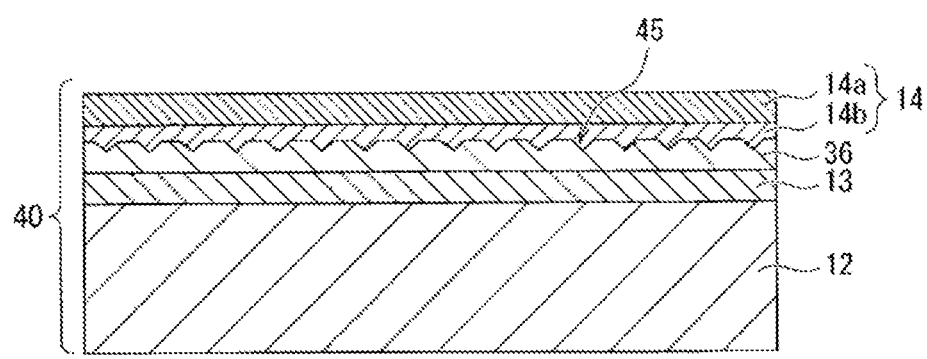
FIG. 4 is a cross-sectional view schematically illustrating an example of a modification of a decorative member according to the second embodiment of the present disclosure.

A modification of the decorative sheet according to the second embodiment will be described with reference to FIG. 4. FIG. 4 is a schematic cross-sectional view for describing an example of a configuration of a decorative sheet 40 according to a modification of the second embodiment. As shown in FIG. 4, in the decorative sheet 40, the surface of the transparent resin layer 36 may be formed with an embossed portion 45 that has been subjected to embossing for imparting a given designability. Like the embossed portion 25 of the decorative sheet 20 according to the first embodiment described above, the uneven shape of the embossed portion 45 includes, for example, wood-grain vessels, stone surface unevenness (such as a granite cleavage plane), textile surface textures, satin finishes, sand grains, hairlines, parallel grooves, and the like. As a result of forming the embossed portion 45 on the transparent resin layer 36, the decorative sheet 40 is imparted with a texture, and the designability can be improved.

Effects of Second Embodiment

The decorative sheet 30 according to the present embodiment provides the following effect in addition to the effects of the first embodiment. (3) The decorative sheet 30 of the present embodiment includes the transparent resin layer 36.

According to this configuration, the entire decorative sheet can be imparted with both improved strength and cushioning properties.

Third Embodiment

Figure 5:
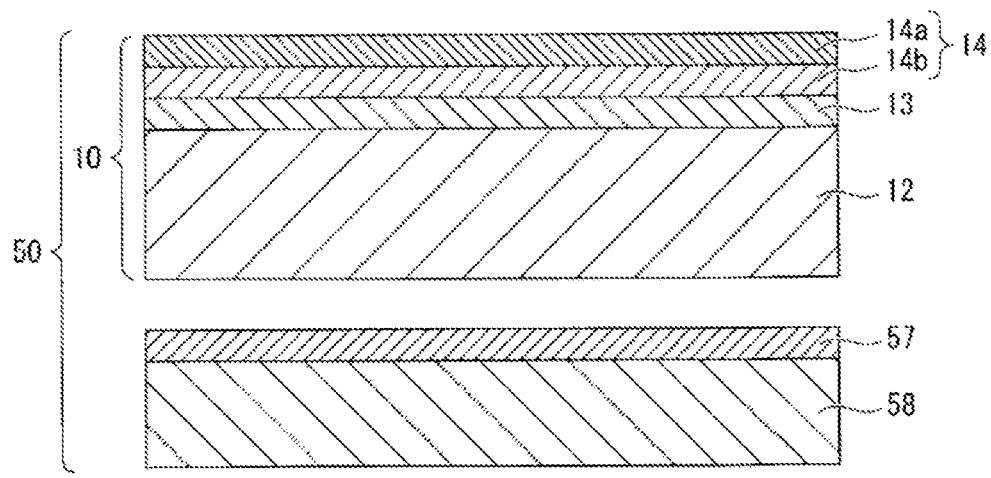
FIG. 5 is a cross-sectional view schematically illustrating an example of a configuration of a decorative sheet according to a third embodiment of the present disclosure.

A decorative member according to a third embodiment of the present disclosure will be described using FIG. 5. FIG. 5 is a cross-sectional view for describing an example of a configuration of a decorative member 50 according to the third embodiment of the present disclosure.
(Configuration of Decorative Member)

The decorative member 50 has a pattern layer 13 and a surface protective layer 14 laminated in this order on one surface of a colored layer 12, and an adhesive layer 57 and a fitting substrate 58 provided on the other surface of the colored layer 12.

That is, the decorative member 50 differs from the decorative sheet 10 according to the first embodiment in that it includes the adhesive layer 57 and the fitting substrate 58.

The adhesive layer 57 and the fitting substrate 58 will be described below. Because the layers other than the adhesive layer 57 and the fitting substrate 58 (the colored layer 12, the pattern layer 13, and the surface protective layer 14) have the same structure as the layers of the decorative sheet 10, the description will be omitted.
(Adhesive Layer)

The adhesive layer 57 is provided as necessary to improve the adhesion to an adhesive used for adhesion to a substrate to be provided on the surface of the colored layer 12 of the decorative member 50 on the side opposite to the pattern layer 13. For example, when the substrate is made of a wooden material, an adhesive such as vinyl acetate emulsion-based adhesive or a two-component curable urethane adhesive is used, and thus it is preferable to design the adhesive layer 57 using a resin which matches these adhesives. For example, urethane-based, acrylic-based, ethylene-vinyl acetate copolymer, vinyl chloride-vinyl acetate copolymer-based, and polyester-based adhesives can be used. In particular, a two-component curable urethane-based primer and the like obtained by blending a polyester polyol and a polyisocyanate is preferable. Furthermore, for example, the addition of an inorganic powder such as silica, barium sulfate, or calcium carbonate is effective for preventing blocking during roll storage and for improving the adhesion due to an anchoring effect.
(Fitting Substrate)

It is possible to use plywood made of tropical wood, particle board, medium-density fiberboard (hereinafter referred to as MDF), ordinary plywood as specified by Japanese Agricultural Standards, and the like as the fitting substrate 58. Furthermore, a substrate made of a wood powder-added olefinic resin can also be used. The thickness of the fitting substrate 58 is preferably about 3 mm or more and 25 mm or less. The fitting substrate 58 may be metal such as aluminum, a resin such as plastic, or a composite material thereof. As a result of forming the fitting substrate 58, it is possible to provide a decorative sheet 40 that is capable of suppressing the occurrence of scratches caused by shoe heels or pebbles during heavy foot traffic.

In the present embodiment, the adhesive layer 57 and the fitting substrate 58 are laminated on the decorative sheet 10, but the decorative member may be formed using the decorative sheet 20, the decorative sheet 30, or the decorative sheet 40 instead of the decorative sheet 10.

Effect of Third Embodiment

The decorative member 50 according to the present embodiment provides the following effect in addition to the effects of the first embodiment and the second embodiment. (4) The decorative member 50 of the present embodiment includes the adhesive layer 57 and the fitting substrate 58.

According to this configuration, it is possible to suppress the occurrence of scratches caused by shoe heels or pebbles during heavy foot traffic.

EXAMPLES

Hereinafter, the present disclosure will be described in more detail with reference to examples, but the present disclosure is in no way limited by these examples.

Example 1

A colored thermoplastic resin layer made of an olefin material was used as a substrate sheet. A wood grain pattern was printed thereon with a gravure printing machine as a pattern layer. Furthermore, a transparent sheet composed of an olefin material was laminated as a transparent resin layer on the pattern layer. Here, the thickness of the transparent resin layer was set to 80 µm. Then, a heat-curable resin (UC CLEAR, manufactured by DIC Graphics Corporation) was applied with a thickness of 3 µm as an inner layer (second surface protective layer) of the surface protective layer. In addition, a heat-curable resin (UC CLEAR, manufactured by DIC Graphics Corporation) was applied with a thickness of 3 µm as an outermost layer (first surface protective layer) of the surface protective layer. At this time, a silver-based inorganic additive (BIOSAIDO TB-B100, manufactured by Taisho Technos Co., Ltd.) was blended as an antiviral agent in the heat-curable resin of the outermost layer at a solid content ratio of 0.2%. The antiviral agent had a structure in which silver ions are supported on an inorganic material. Furthermore, the average particle size (1) of the antiviral agent was set to 5 µm. Here, the first peak in the particle sizes of the antiviral agent was 3 µm, and the second peak was 7 µm. Moreover, the average particle size (1) of the antiviral agent with respect to the thickness D (3 µm in the present example) of the outermost layer (first surface protective layer) of the surface protective layer was set to 1.67 D. Then, the heat-curable resin was cured by heating. The decorative sheet of Example 1 was obtained as a result of the preparation above.

Example 2

The amount of the antiviral agent added was changed to 7% by mass. Except for the above, a decorative sheet of Example 2 was made by the same method as in Example 1.

Example 3

The main component of the outermost layer (first surface protective layer) of the surface protective layer was changed to an ultraviolet-curable resin (urethane acrylate resin, manufactured by DIC Graphics Corporation). Furthermore, the thickness of the outermost layer was changed to 6 µm. Except for the above, a decorative sheet of Example 3 was made by the same method as in Example 1.

Example 4

The main component of the outermost layer (first surface protective layer) of the surface protective layer was changed to an electron beam-curable resin. Except for the above, a decorative sheet of Example 4 was made by the same method as in Example 1.

Example 5

The amount of the antiviral agent added was changed to 10% by mass. Except for the above, a decorative sheet of Example 5 was made by the same method as in Example 1.

Example 6

The amount of the antiviral agent added was changed to 14% by mass. Except for the above, a decorative sheet of Example 6 was made by the same method as in Example 1.

Example 7

The average particle size ($\Phi$) of the antiviral agent was changed to 1 µm. Except for the above, a decorative sheet of Example 7 was made by the same method as in Example 2.

Example 8

The average particle size ($\Phi$) of the antiviral agent was changed to 10 µm. Except for the above, a decorative sheet of Example 8 was made by the same method as in Example 2.

Example 9

The first peak in the particle sizes of the antiviral agent was changed to 0.1 µm. Except for the above, a decorative sheet of Example 9 was made by the same method as in Example 2.

Example 10

The first peak of the particle size of the antiviral agent was changed to 1 µm. Except for the above, a decorative sheet of Example 10 was made by the same method as in Example 2.

Example 11

The first peak in the particle sizes of the antiviral agent was changed to 5 µm. Except for the above, a decorative sheet of Example 11 was made by the same method as in Example 2.

Example 12

The first peak in the particle sizes of the antiviral agent was changed to 6 µm. Except for the above, a decorative sheet of Example 12 was made by the same method as in Example 2.

Example 13

The second peak in the particle sizes of the antiviral agent was changed to 4 µm. Except for the above, a decorative sheet of Example 13 was made by the same method as in Example 2.

Example 14

The second peak in the particle sizes of the antiviral agent was changed to 5 µm. Except for the above, a decorative sheet of Example 14 was made by the same method as in Example 2.

Example 15

The second peak in the particle sizes of the antiviral agent was changed to 10 µm. Except for the above, a decorative sheet of Example 15 was made by the same method as in Example 2.

Example 16

The second peak in the particle sizes of the antiviral agent was changed to 20 µm. Except for the above, a decorative sheet of Example 16 was made by the same method as in Example 2.

Example 17

The first peak in the particle sizes of the antiviral agent was changed to 0.1 µm, and the second peak was changed to 4 µm. Except for the above, a decorative sheet of Example 17 was made by the same method as in Example 2.

Example 18

The first peak in the particle sizes of the antiviral agent was changed to 10 µm, and the second peak was changed to 20 µm. Except for the above, a decorative sheet of Example 18 was made by the same method as in Example 2.

Example 19

The thickness of the surface protective layer was changed to 2 µm. Except for the above, a decorative sheet of Example 19 was made by the same method as in Example 2.

Example 20

The thickness of the surface protective layer was changed to 3 µm. Except for the above, a decorative sheet of Example 20 was made by the same method as in Example 2.

Example 21

The thickness of the surface protective layer was changed to 15 μm. Except for the above, a decorative sheet of Example 21 was made by the same method as in Example 2.

Example 22

The thickness of the surface protective layer was changed to 25 μm. Except for the above, a decorative sheet of Example 22 was made by the same method as in Example 2.

Example 23

The thickness of the transparent resin layer was changed to 20 μm. Except for the above, a decorative sheet of Example 23 was made by the same method as in Example 2.

Example 24

The thickness of the transparent resin layer was changed to 30 μm. Except for the above, a decorative sheet of Example 24 was made by the same method as in Example 2.

Example 25

The thickness of the transparent resin layer was changed to 200 μm. Except for the above, a decorative sheet of Example 25 was made by the same method as in Example 2.

Example 26

The thickness of the transparent resin layer was changed to 210 μm. Except for the above, a decorative sheet of Example 26 was made by the same method as in Example 2.

Comparative Example 1

Addition of the antiviral agent to the surface protective layer was omitted. Except for the above, a decorative sheet of Comparative Example 1 was made by the same method as in Example 26.

Comparative Example 2

The amount of the antiviral agent added was changed to 0.1% by mass. Except for the above, a decorative sheet of Comparative Example 2 was made by the same method as in Example 1.

Comparative Example 3

The average particle size (Φ) of the antiviral agent was changed to 0.5 μm. Except for the above, a decorative sheet of Comparative Example 3 was made by the same method as in Example 2.

Comparative Example 4

The average particle size (Φ) of the antiviral agent was changed to 13 μm. Except for the above, a decorative sheet of Comparative Example 4 was made by the same method as in Example 2.

<Evaluation Criteria>

The antiviral performance and bending processability of the decorative sheets obtained in Examples 1 to 26 and Comparative Examples 1 to 4 described above were evaluated by the following methods.

<Evaluations>

[Antiviral Performance]

An antiviral test according to ISO 21702 was performed with respect to the decorative sheets obtained in Examples 1 to 26 and Comparative Examples 1 to 4. A 50 mm square test specimen was placed in a sterilized petri dish, and 0.4 mL of a virus solution was inoculated onto the specimen. At this time, a virus solution containing an enveloped virus (influenza virus) was used as the virus solution. Then, the specimen was covered with a 40 mm square polyethylene film. After the petri dish was covered, the specimen and the virus were inoculated under conditions of a temperature of 25° C. and a humidity of 90% or more. After a predetermined time (24 hours), 10 mL of an SCDLP medium was poured into the petri dish to wash out the virus. The viral infectivity titer of the washing liquid was measured by the plaque method.

<Measurement of Viral Infectivity Titer (Plaque Method)>

Host cells were grown in monolayers on 6-well plates, and 0.1 mL of serially diluted washing liquids were inoculated into each well. After culturing for 1 hour under conditions of 5% CO2 and a temperature of 37° C., and allowing the virus to adsorb to the cells, an agar medium was poured into the 6-well plate and further cultured for 2 to 3 days. After culturing, the cells were fixed and stained, and the number of plaques formed was counted.

<Calculation of Viral Infectivity Titer>

The virus infectivity titer per 1 cm2 of specimen was calculated according to the following formula.

$$V=(10 \times C \times D \times N)/A$$

V: viral infectivity titer per 1 cm2 of specimen (PFU/cm2)
C: number of measured plaques
D: dilution factor of well in which plaques were measured
N: amount of SCDLP
A: contact area between specimen and virus (area of polyethylene film)

<Calculation of Antiviral Activity Value>

The antiviral activity value was calculated according to the following formula. Here, when the antiviral activity value was 2 log 10 or more, it was determined that an antiviral effect was obtained.

$$\text{Antiviral activity value}=\log(Vb)-\log(Vc)$$

Log(Vb): common logarithm of viral infectivity titer per 1 cm2 of unprocessed specimen after 24 hours
Log(Vc): common logarithm of viral infectivity titer per 1 cm2 of antiviral processed specimen after 24 hours The calculated antiviral activity value was evaluated according to the three grades of excellent, good, and poor as described below.

<Evaluation Criteria>

Excellent: antiviral activity value was 3 log 10 or more
Good: antiviral activity value was 2 log 10 or more
Poor: antiviral activity value was less than 2 log 10

[Bending Processability]

The surface of MDF (hardwood) with a thickness of 3 mm serving as a fitting substrate was applied with 100 g/m2 of a two-component aqueous emulsion adhesive ("Rika Bond" (weight ratio BA–10 L/BA–11B=100:2.5), manufactured by CHIRIKA. Co. Ltd.,) in a wet state, and then the decorative sheets of Examples 1 to 14 and Comparative Examples 1 to 4 were respectively laminated and cured for 24 hours to obtain fitting decorative members of Examples 1 to 26 and Comparative Examples 1 to 4.

V-cut processing was carried out on the fitting decorative members, and the external appearance was confirmed by visually observing the top portion of the bend. In the V-cut processing, a V-shaped groove was formed from the surface of the fitting decorative member on the side on which the decorative sheet was not attached to the boundary where the fitting substrate and the decorative sheet were laminated, such that the decorative sheet was not scratched. Then, the fitting substrate was folded to 90 degrees along the V-shaped groove so that the surface on which the decorative sheet 1 was attached formed a mountain fold.

<Evaluation Criteria>
Excellent: No cracking, whitening and the like of the surface protective layer at the top portion of the bend.
Good: Almost no cracking, whitening and the like of the surface protective layer at the top portion of the bend.
Fair: Cracking and whitening occurred in part of the surface protective layer at the top portion of the bend.
Poor: Cracking and whitening occurred in the surface protective layer at the top portion of the bend.

The evaluation results above are shown in Table 1.

TABLE 1

| | Surface protective layer | | | | | | | | | | |
|---|---|---|---|---|---|---|---|---|---|---|---|
| | | | Antiviral agent | | | | | Average particle size of antiviral agent relative | Transparent | | |
| | Inner layer Material | Outermost layer Material | Addition amount (% by mass) | Average particle size, Φ (μm) | First peak in particle sizes (μm) | Second peak in particle sizes (μm) | Thickness of outermost layer, D (μm) | to thickness D of outermost protective layer | resin layer Thickness (μm) | Antiviral properties | Processability |
| Example 1 | Heat-curable resin | Heat-curable resin | 0.2 | 5 | 3 | 7 | 3 | 1.67D | 80 | Excellent | Excellent |
| Example 2 | Heat-curable resin | Heat-curable resin | 7 | 5 | 3 | 7 | 6 | 0.87D | 80 | Excellent | Excellent |
| Example 3 | Heat-curable resin | Ultraviolet-curable resin | 7 | 5 | 3 | 7 | 3 | 1.67D | 80 | Excellent | Excellent |
| Example 4 | Heat-curable resin | Electron beam-curable resin | 7 | 5 | 3 | 7 | 3 | 1.67D | 80 | Excellent | Excellent |
| Example 5 | Heat-curable resin | Heat-curable resin | 10 | 5 | 3 | 7 | 3 | 1.67D | 80 | Excellent | Excellent |
| Example 6 | Heat-curable resin | Heat-curable resin | 14 | 5 | 3 | 7 | 3 | 1.67D | 80 | Good | Fair |
| Example 7 | Heat-curable resin | Heat-curable resin | 7 | 1 | 3 | 7 | 3 | 0.33D | 80 | Excellent | Good |
| Example 8 | Heat-curable resin | Heat-curable resin | 7 | 10 | 3 | 7 | 3 | 3.33D | 80 | Excellent | Good |
| Example 9 | Heat-curable resin | Heat-curable resin | 7 | 5 | 0.1 | 7 | 3 | 1.67D | 80 | Good | Excellent |
| Example 10 | Heat-curable resin | Heat-curable resin | 7 | 5 | 1 | 7 | 3 | 1.67D | 80 | Excellent | Excellent |
| Example 11 | Heat-curable resin | Heat-curable resin | 7 | 5 | 5 | 7 | 3 | 1.67D | 80 | Excellent | Excellent |
| Example 12 | Heat-curable resin | Heat-curable resin | 7 | 5 | 6 | 7 | 3 | 1.67D | 80 | Good | Excellent |
| Example 13 | Heat-curable resin | Heat-curable resin | 7 | 5 | 3 | 4 | 3 | 1.67D | 80 | Good | Excellent |
| Example 14 | Heat-curable resin | Heat-curable resin | 7 | 5 | 3 | 5 | 3 | 1.67D | 80 | Excellent | Excellent |
| Example 15 | Heat-curable resin | Heat-curable resin | 7 | 5 | 3 | 10 | 3 | 1.67D | 80 | Excellent | Excellent |
| Example 16 | Heat-curable resin | Heat-curable resin | 7 | 5 | 3 | 20 | 3 | 1.67D | 80 | Good | Excellent |
| Example 17 | Heat-curable resin | Heat-curable resin | 7 | 5 | 0.1 | 4 | 3 | 1.67D | 80 | Good | Excellent |
| Example 18 | Heat-curable resin | Heat-curable resin | 7 | 5 | 10 | 20 | 3 | 1.67D | 80 | Good | Excellent |
| Example 19 | Heat-curable resin | Heat-curable resin | 7 | 5 | 3 | 7 | 2 | 2.5D | 80 | Excellent | Good |
| Example 20 | Heat-curable resin | Heat-curable resin | 7 | 5 | 3 | 7 | 3 | 1.67D | 80 | Excellent | Excellent |
| Example 21 | Heat-curable resin | Heat-curable resin | 7 | 5 | 3 | 7 | 15 | 0.33D | 80 | Excellent | Excellent |
| Example 22 | Heat-curable resin | Heat-curable resin | 7 | 5 | 3 | 7 | 25 | 0.2D | 80 | Excellent | Good |
| Example 23 | Heat-curable resin | Heat-curable resin | 7 | 5 | 3 | 7 | 3 | 1.67D | 20 | Excellent | Good |
| Example 24 | Heat-curable resin | Heat-curable resin | 7 | 5 | 3 | 7 | 3 | 1.67D | 30 | Excellent | Excellent |

TABLE 1-continued

| | Surface protective layer | | | | | | | | | |
|---|---|---|---|---|---|---|---|---|---|---|
| | | | Antiviral agent | | | | | Average particle size of antiviral agent relative to thickness D of outermost protective layer | Transparent resin layer Thickness (μm) | Evaluation | |
| | Inner layer Material | Outermost layer Material | Addition amount (% by mass) | Average particle size, Φ (μm) | First peak in particle sizes (μm) | Second peak in particle sizes (μm) | Thickness of outermost layer, D (μm) | | | Antiviral properties | Processability |
| Example 25 | Heat-curable resin | Heat-curable resin | 7 | 5 | 3 | 7 | 3 | 1.67D | 200 | Excellent | Excellent |
| Example 26 | Heat-curable resin | Heat-curable resin | 7 | 5 | 3 | 7 | 3 | 1.67D | 210 | Excellent | Good |
| Comparative Ex. 1 | Heat-curable resin | Heat-curable resin | — | — | — | — | 3 | — | 80 | Poor | Excellent |
| Comparative Ex. 2 | Heat-curable resin | Heat-curable resin | 0.1 | 5 | 3 | 7 | 3 | 1.67D | 80 | Poor | Excellent |
| Comparative Ex. 3 | Heat-curable resin | Heat-curable resin | 7 | 0.5 | 3 | 7 | 3 | 0.16D | 80 | Poor | Excellent |
| Comparative Ex. 4 | Heat-curable resin | Heat-curable resin | 7 | 13 | 3 | 7 | 3 | 4.33D | 80 | Poor | Excellent |

As shown in Table 1, from the evaluation results of Examples 1 to 26 and Comparative Examples 1 and 2, when the addition amount of the antiviral agent was 0.2% by mass or more as in Examples 1 to 26, it was found that the antiviral properties were higher than those cases such as Comparative Examples 1 and 2 where the addition amount of the antiviral agent was less than 0.2% by mass.

Furthermore, from the evaluation results of Examples 1 to 26 and Comparative Examples 3 and 4, when the average particle size (1) of the antiviral agent was 1 μm or more and 10 μm or less as in Examples 1 to 26, it was found that the antiviral properties were higher than those cases such as Comparative Example 3 where the average particle size (1) of the antiviral agent was less than 1 μm or greater than 10 μm.

The decorative sheet and the decorative member of the present disclosure are not limited to the above embodiments and examples, and various modifications may be made within a range not impairing the features of the invention.

REFERENCE SIGNS LIST

10, 20, 30, 40: Decorative sheet; 50: Decorative member; 12: Colored layer; 13: Pattern layer; 14: Surface protective layer; 14a: First surface protective layer; 14b: Second surface protective layer; 25, 45: Embossed portion; 36: Transparent resin layer; 57: Adhesive layer; 58: Fitting substrate.

What is claimed is:

1. A decorative sheet, comprising:
   a colored layer;
   a pattern layer formed directly on the colored layer; and
   a surface protective layer;
   wherein
   the surface protective layer is provided with a first surface protective layer that contains an antiviral agent and at least one of a heat-curable resin, an ultraviolet-curable resin, and an electron beam-curable resin,
   the antiviral agent consists of a silver-based material supported by an inorganic material;
   (a) the first surface protective layer has a thickness from 3 microns to 25 microns;
   (b) an addition amount of the antiviral agent with respect to the surface protective layer is 0.2% by mass or more and 10% by mass or less,
   (c) an average particle size of the antiviral agent is 1 μm or more and 10 μm or less; and
   (d) the average particle size of the antiviral agent is 0.2 times to 2.5 times the thickness of the surface protective layer.

2. The decorative material of claim 1, wherein particle sizes of the antiviral agent include a first peak in a range of 1 μm or more and 5 μm or less, and a second peak in a range of 5 μm or more and 10 μm or less.

3. The decorative sheet of claim 1, wherein:
   the colored layer comprises a thermoplastic polyolefin resin,
   a thickness of the colored layer is 40 μm or more and 150 μm or less,
   the pattern layer is formed by printing on the colored layer a printing ink comprising a colorant, a diluent solvent together and a suitable binder resin,
   a thickness of the pattern layer is 1 μm or more and 10 μm or less.

4. The decorative sheet of claim 1, wherein
   the surface protective layer further includes a second surface protective layer provided between the first surface protective layer and the pattern layer.

5. The decorative sheet of claim 2, wherein
   the surface protective layer further includes a second surface protective layer provided between the first surface protective layer and the pattern layer.

* * * * *